(12) United States Patent
Pinciaro

(10) Patent No.: US 6,641,177 B1
(45) Date of Patent: Nov. 4, 2003

(54) QUICK CONNECT TUBE COUPLING AND METHOD OF ASSEMBLING THE SAME

(75) Inventor: John Pinciaro, Woodbridge, CT (US)

(73) Assignee: Precision Design Concepts, LLC, Woodbridge, CT (US)

( * ) Notice: Subject to any disclaimer, the term of this patent is extended or adjusted under 35 U.S.C. 154(b) by 173 days.

(21) Appl. No.: 09/649,432

(22) Filed: Aug. 25, 2000

(51) Int. Cl.⁷ .................................................. F16L 33/00
(52) U.S. Cl. ........................ 285/242; 285/257; 285/319; 285/921
(58) Field of Search ................................. 285/242, 239, 285/241, 244, 257, 319, 921, 245

(56) References Cited

U.S. PATENT DOCUMENTS

| | | | |
|---|---|---|---|
| 2,179,930 A | 11/1939 | Harrington | 285/86 |
| 3,222,091 A | 12/1965 | Marshall | 285/95 |
| 3,653,689 A | 4/1972 | Sapy et al. | 285/113 |
| 4,214,586 A * | 7/1980 | Mericle | 285/921 X |
| 4,564,222 A | 1/1986 | Loker et al. | 285/243 |
| 4,577,894 A | 3/1986 | Wake | 285/242 |
| 4,603,888 A | 8/1986 | Goodall | 285/55 |
| 4,632,435 A * | 12/1986 | Polyak | 285/319 X |
| 4,635,972 A | 1/1987 | Lyall | 285/242 |
| 4,685,706 A | 8/1987 | Kowal | 285/322 |
| 4,749,217 A * | 6/1988 | Causby et al. | 285/245 |
| 4,946,200 A * | 8/1990 | Blenkush et al. | 285/921 X |
| 5,072,072 A | 12/1991 | Bawa et al. | 174/65 |
| 5,141,263 A * | 8/1992 | Varden | 285/319 X |
| 5,316,350 A * | 5/1994 | Kollenbrandt et al. | 285/242 |
| 5,390,969 A | 2/1995 | Guest | 285/38 |
| 5,498,043 A | 3/1996 | Goldenberg | 285/242 |
| 5,564,757 A | 10/1996 | Seabra | 285/322 |
| 5,582,436 A | 12/1996 | Bartholomew | 285/242 |
| 5,772,643 A * | 6/1998 | Howell et al. | 285/921 X |
| 5,775,742 A | 7/1998 | Guest | 285/323 |
| 5,865,996 A | 2/1999 | Reid | 210/232 |
| 5,882,048 A * | 3/1999 | Kawasaki et al. | 285/319 |
| 5,915,738 A | 6/1999 | Guest | 285/24 |
| 6,000,729 A * | 12/1999 | Williamson et al. | 285/242 |
| 6,231,085 B1 * | 5/2001 | Olson | 285/242 X |
| 6,270,125 B1 * | 8/2001 | Rowley et al. | 285/242 |
| 6,318,410 B1 * | 11/2001 | Miyajima et al. | 285/319 X |

FOREIGN PATENT DOCUMENTS

| | | |
|---|---|---|
| DE | 3921443 A1 | 1/1991 |
| DE | 42V09795 A1 | 9/1993 |
| EP | 275749 * | 7/1988 ............. 285/319 X |
| EP | 0349344 A2 | 1/1990 |
| IT | 663497 | 5/1964 |

* cited by examiner

Primary Examiner—David Bochna
(74) Attorney, Agent, or Firm—Gordon & Jacobson, P.C.

(57) ABSTRACT

A coupling system for coupling flexible tubing between ports includes a port element provided with a barb, and a clamp which secures the tubing over the port element. A first end of the clamp is formed as a plurality of axially extending resilient, yet stiff, fingers having a barb at a tip. The fingers are biased slightly inward toward a center of the channel to define an inner diameter which is smaller than the outer diameter of the tubing. A diameter at the second end of the clamp is larger than a diameter of the tubing to allow for easier installation of the tubing through the channel of the clamp. A diameter of a portion of the channel between the first end and the second end is substantially the same or slightly smaller than the diameter of the tubing such that the clamp snugly grips the tubing without affecting the flow through the tubing. In use, the tubing is inserted through the second end of the clamp, and the tubing is then positioned over the barb of the port element. The clamp is then forcibly slid along the tubing such that the barbs ride over and then lock about the barb of the port element. This simple and quick operation creates a water-tight seal. In another embodiment, the second end of the clamp is provided with a plurality of alternating pegs and holes oriented parallel to the axis of the clamp which detachably couples two clamps in a back-to-back arrangement.

26 Claims, 6 Drawing Sheets

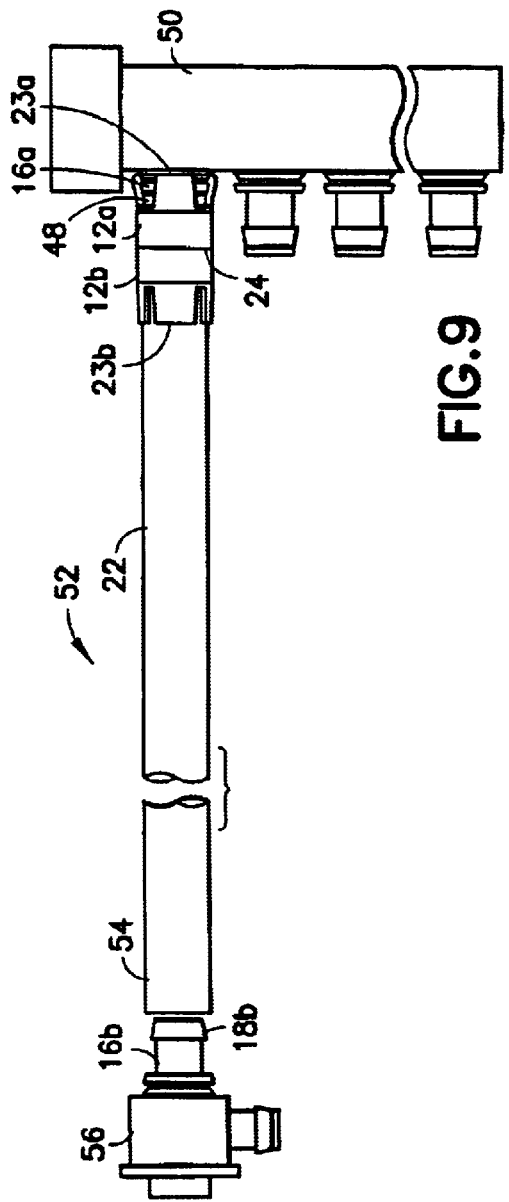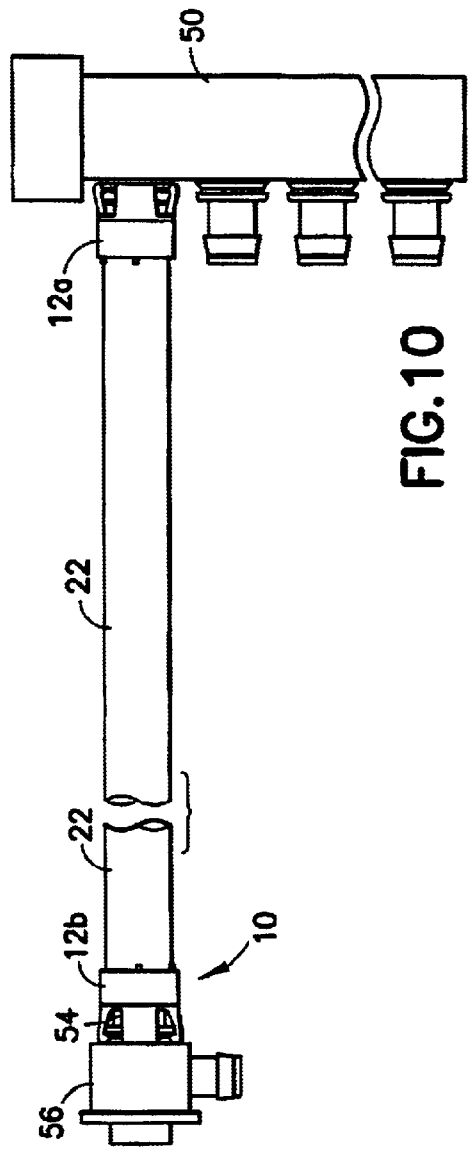

QUICK CONNECT TUBE COUPLING AND METHOD OF ASSEMBLING THE SAME

BACKGROUND OF THE INVENTION

1. Field of the Invention

This invention relates broadly to tube couplings. More particularly, this invention relates to end fitting tube couplings which can quickly and securely connect a tube to a port without the need for additional retaining means.

2. State of the Art

Hot tubs, spas, and bathtubs are generally relatively deep tubs formed by rotational molding, blow-molding or vacuum-forming. The tubs are provided with a number of fixtures including water jet assemblies. The appeal of hot tubs and spas is primarily due to the hydrotherapy provided by pressurized water jet assemblies recessed into the tub wall which provide a massaging action.

In particular, each hydrotherapy jet assembly is connected via flexible conduits to water and air manifolds which supply pressurized water and air to each jet assembly of the spa tub. The pressurized water flows through a hydrotherapy jet assembly having an expanded throat, i.e., a venturi. As the water flows through the expanded throat, the water at the center of the throat moves more rapidly than the water along the sides of the nozzle. As a result, a low pressure area is created at the center of the throat. Air is drawn from an inlet into the low pressure area and mixes with the water. The mixture of pressurized water and air thereby provide an aerated therapeutic jet of water.

Hydrotherapy jet fixtures are generally installed in a hole in the tub wall, with the fixture outlet directed into the interior of the tub. The rear of the fixture includes an air inlet and a water inlet connected to plumbing which separately provides air and water supplies. The connections of the jet fixture to the plumbing is typically a serpentine collection of flexible conduits which each must be coupled between a manifold and the respective jet fixtures at the time of spa plumbing installation. The current method of installation is undesirable for several reasons. First, all connections between plumbing fixtures (air manifold, water manifold, and spa jet fixtures) are made at the time of installation. This requires a large number of connections to be made at the installation site in typically cramped working conditions. Moreover, it may be difficult to reach and accomplish the connection due to the location of a particular jet fixture. Second, each plumbing connection (at the manifold side and water and air inlets) must be glued or clamped in position by a skilled worker. If the connection is glued, several steps must be performed: opening the glue container, using an applicator to remove glue from the container, applying the glue to the outside of an end of a conduit, closing the glue container, inserting the end of the conduit into a respective slip fitting in a plumbing fixture, and holding the conduit relative to the plumbing fixture until the glue sets to secure the connection. This process must be repeated for each glued connection and can be time consuming and exhausting, particularly at hard-to-reach connections. Also, gluing requires good ventilation and a respirator should be used to avoid inhaling the glue fumes. If the connection is clamped, special tools are required and it may be difficult to utilize the tools for tightening the clamp about the conduit in the space available. Furthermore, in cramped location it is difficult to properly center the clamp over the conduit such that even pressure is provided about the conduit. When clamping is uneven, leaking may result or the connection may even completely disconnect over time.

SUMMARY OF THE INVENTION

It is therefore an object of the invention to provide a tube coupling system which is easy to use, has a minimum number of parts, and forms a strong, secure, and water-tight seal between a flexible tube and a port element It is another object of the invention to provide a tube coupling system which requires little technician training, and which can secure a tubing to a port element without the need for tools or additional retaining means.

It is a further object of the invention to provide a tube coupling system which is self-centering to prevent coupling failures.

It is an additional object of the invention to provide a tube coupling system which is particularly suitable for spa tub fixtures and plumbing.

It is also an object of the invention to provide a tube coupling system which permits partial assembly prior to arriving at a job site thereby facilitating quick installations.

It is yet another object of the invention to provide a tube coupling system which is inexpensive to manufacture, reliable, and simple to install.

In accord with these objects, which will be discussed in detail below, a coupling system for coupling flexible tubing between ports, e.g., between a manifold and a spa jet assembly in spa tub plumbing is provided. The coupling system includes a component having a port element over which the tubing is provided, and a clamp which is lockable to the port element and maintains the tubing on the port element in a fluid-tight seal. The port element includes a barb and catch preferably defined by a beveled or tapered lip and a preferably circumferential groove defined behind the lip. The clamp is substantially cylindrical and generally has first and second ends and an axial channel therethrough. The first end of the clamp is formed as a plurality of generally axially extending resilient, yet stiff, fingers separated by gaps and spaced equidistantly apart around the circumference of the first end of the clamp. The fingers have a tip and an inner surface having a barbed portion near the tip. The fingers are biased slightly inward toward a center of the channel to define an inner diameter which is smaller than the outer diameter of the tubing. A diameter at the second end of the clamp is preferably larger than a diameter of the tubing to allow for easier installation of the tubing through the channel of the clamp. A diameter of a central clamping portion of the channel between the first end and the second end is slightly larger than the diameter of the barb of the port element, such that when tubing is positioned over the barb, the clamp snugly grips the tubing between the clamping potion and the barb.

In use, the tubing is inserted through the second end of the clamp, and the tubing is then positioned over the barb of the port element. The clamp is then forcibly slid along the tubing such that the barbed flanges ride over the port element and the lip until the flanges lock in the groove. This simple and quick operation creates a self-aligning water-tight seal between the port element and the tubing. No additional sealing means or clamp retention means are required.

According to another preferred aspect of the invention, the second end of the clamp is provided with a plurality of alternating pegs and holes oriented parallel to the axis of the clamp. The alternating pegs and holes on the second end of a first clamp correspond to alternating holes and pegs on the second end of a second clamp such that the second ends of two clamps can be detachably coupled in an interference fit between the respective pegs and holes. As such, the pair of clamps may be provided onto tubing, with one of the clamps optionally securing a first end of the tubing to a port portion of a component. This partial assembly may be performed off-site and the connection at the second end of the tubing may be completed at a job site. That is, once at the job site, the second end of the tubing is provided over the barb of a second port portion of a second component, the second clamp is decoupled from the first clamp and slid along the tubing to the second port portion, and second clamp is moved to secure the tubing the second port portion as described above.

Additional objects and advantages of the invention will become apparent to those skilled in the art upon reference to the detailed description taken in conjunction with the provided figures.

BRIEF DESCRIPTION OF THE DRAWINGS

FIG. 9 is a schematic illustrating an assembly of tubing coupled to one port element using clamps coupled in a back-to-back relation;

FIG. 10 is a schematic illustrating an assembly of tubing coupled to two ports using clamps which were previously coupled in a back-to-back relation;

DETAILED DESCRIPTION OF THE PREFERRED EMBODIMENTS

Figure 1:
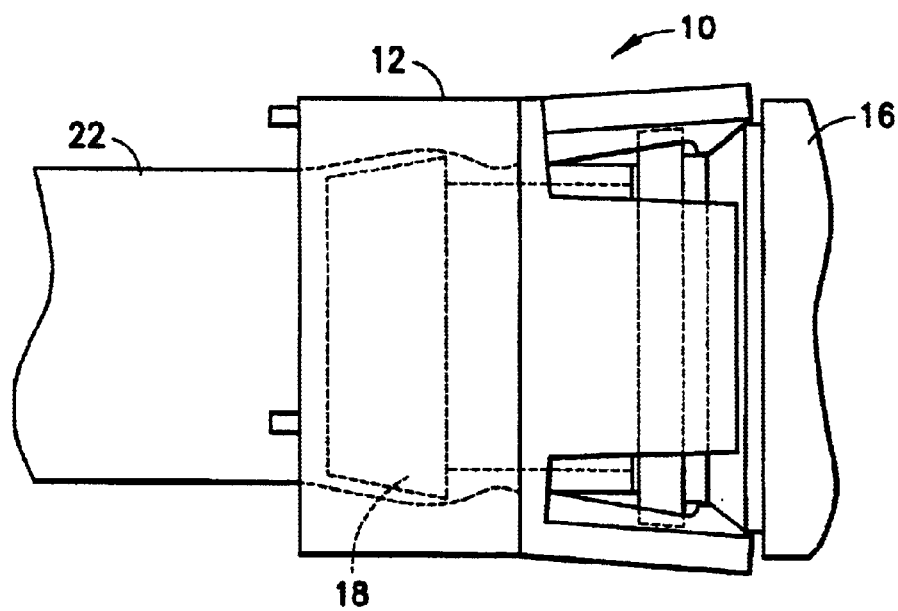
FIG. 1 is a broken side view of a coupling system of the invention shown coupling tubing between a clamp of the coupling system and a port of the coupling system.
Figure 2:
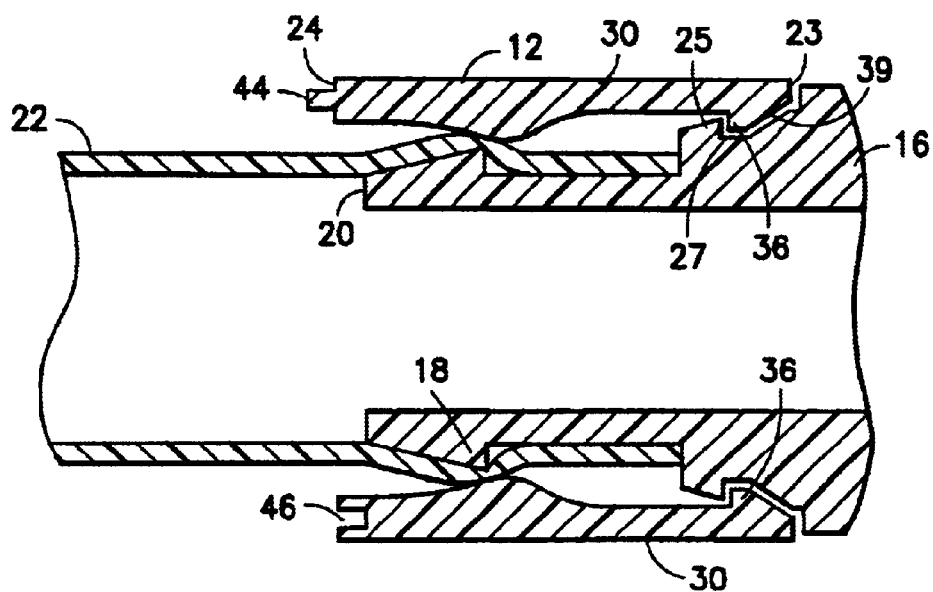
FIG. 2 is longitudinal section view of the coupling system of FIG. 1.

Turning now to FIGS. 1 and 2, a coupling system 10 according to the invention includes a clamp 12 and a port element 16. The port element 16 has a circumferential barb 18 adjacent an end 20, a tapered or beveled lip 25 and a preferably circumferential groove 27 defined behind the lip, the lip and groove together defining a catch. The clamp is substantially cylindrical and generally has first and second ends and an axial channel therethrough. The clamp 12 is adapted to quickly and simply secure the end of a tubing 22 to the port element 16 without the need for additional retention means such as an adhesive or a clamp securing and tightening mechanism such as found on a hose clamp.

Figure 3:
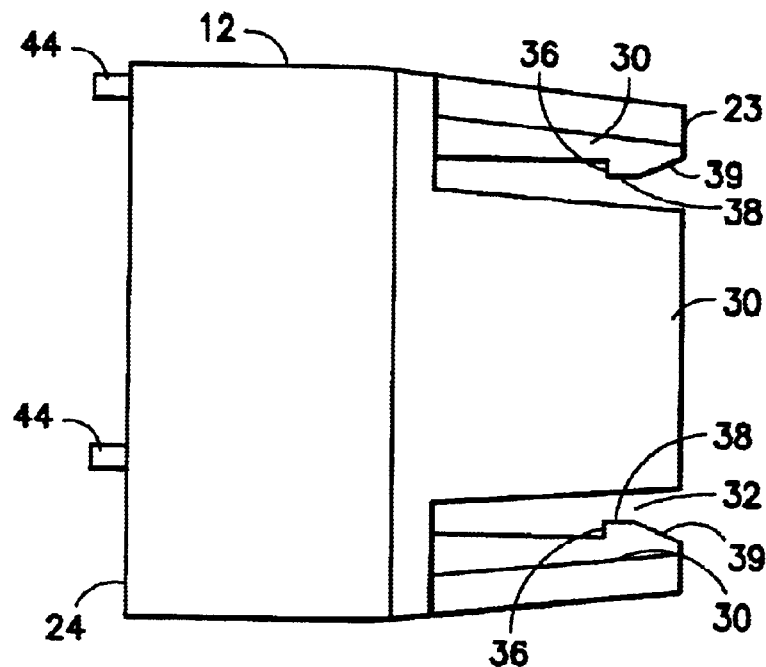
FIG. 3 is a side view of the clamp of the coupling system of the invention in a relaxed state.
Figure 4:
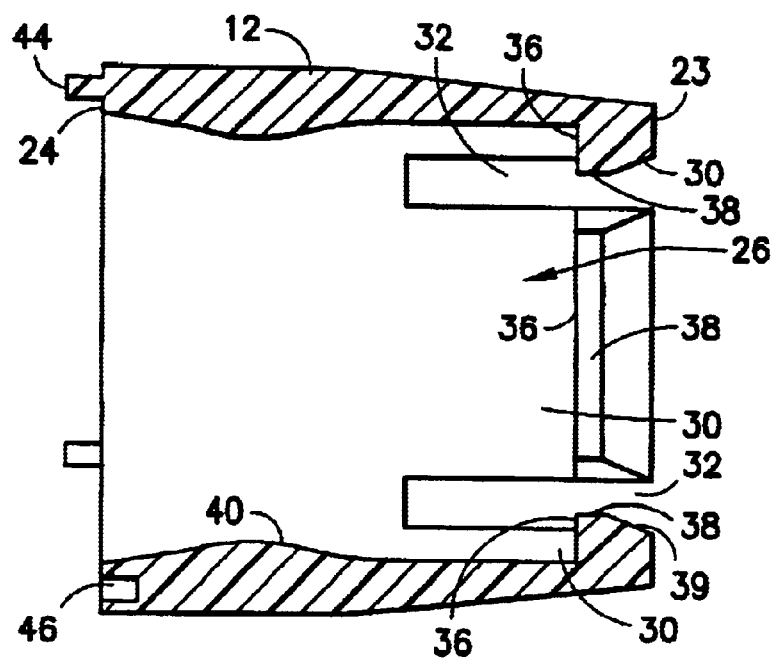
FIG. 4 is a longitudinal section view of the clamp of FIG. 3.
Figure 5:
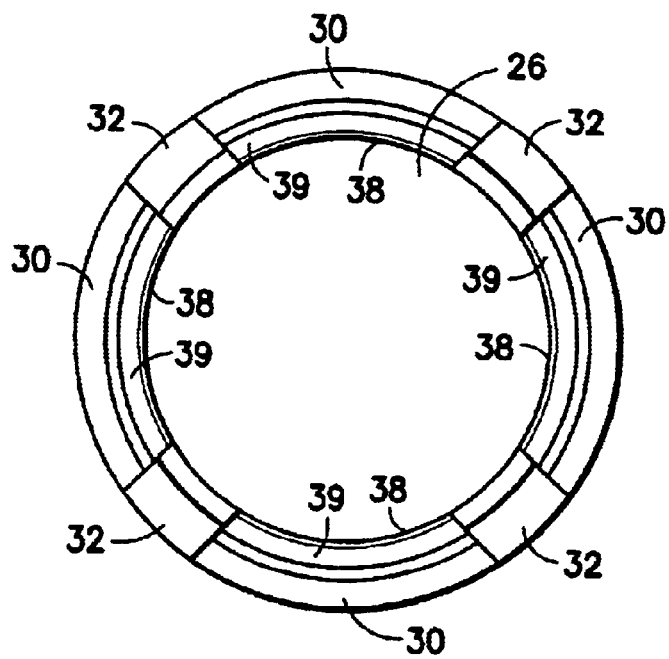
FIG. 5 is a front end view of the clamp of the coupling system of the invention.

More particularly, referring to FIGS. 3 and 4, the clamp 12 of the invention has a substantially cylindrical interior defining an axial channel 26, and has first and second ends 23, 24. The first end 23 of the clamp 12 is formed as a plurality of, e.g., four, axially extending relatively stiff fingers 30 separated by gaps 32 and preferably spaced equidistantly apart. The fingers 30 of the clamp 12 are tapered slightly inwardly toward a center of the channel 26. The fingers 30 are resilient and when subjected to a sufficient radial force are adapted to flex radially a small amount. Each of the fingers 30 of the clamp 12 preferably has an inwardly directed barb-like catch 36 provided with a relatively blunt inner portion 38 and a ramped portion 39. The ramped portion facilitates insertion of the fingers 30 onto and over the circumferential, barb 18 and further over the lip 25 of the port element 16. The blunt inner portion 38 contacts the tubing 22 and prevents the catch 36 from undesirably digging into the flexible tubing 22 when the clamp is slid therealong.

Referring to FIGS. 2 and 4, according to the invention, the channel diameter measured at the catches 36 of the fingers 30 is preferably approximately the same size as the.outer diameter of the tubing 22 such that the clamp is slidable along the tubing. The channel diameter at the second end 24 of the clamp 12 is preferably larger than the exterior diameter of the tubing 22 to facilitate insertion of the tubing 22 through the clamp. The channel diameter at a constricted clamping portion 40 between the first and second ends 23, 24 is slightly larger than or substantially the same as the diameter of the circumferential barb 18 of the port element, such that when the tubing 22 is positioned over the barb, the clamp snugly grips the tubing between the clamping portion 40 and the barb 18. The clamp 12 is molded from a single piece of material, preferably plastic, such as, e.g., delrin or a similar material. The clamp 12 preferably includes a portion which has an unbroken circumference.

Still referring to FIGS. 2 and 4, the barb 18 of the port element 16 has an external diameter which is preferably substantially the same or slightly larger than the inner diameter of tubing 22 to which it is being coupled. That is, the tubing 22 has an inner diameter substantially the same or slightly smaller than the external diameter of the barb 18. Alternatively, the circumferential barb 18 may have a diameter smaller than the inner diameter of the tubing, provided that the clamping portion 40 of the clamp 12 is sized to compress the tubing between the barb 18 and the clamping portion 40.

Figure 6:
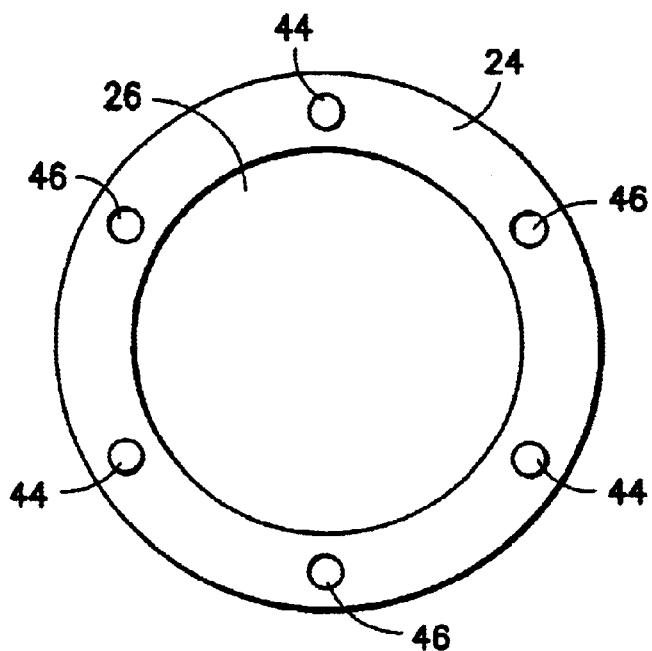
FIG. 6 is a rear end view of the clamp of the coupling system of the invention.
Figure 7:
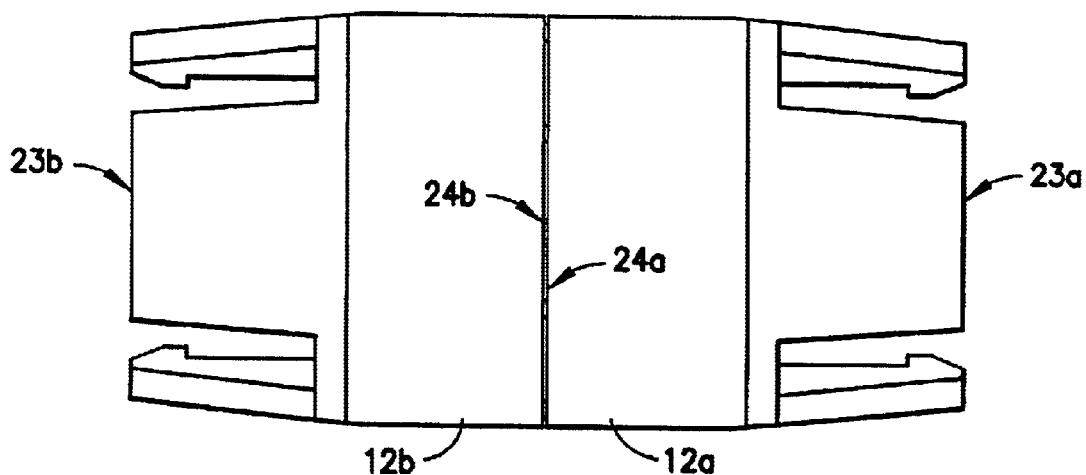
FIG. 7 is a side elevation view of a pair of clamps coupled in a back-to-back relation.
Figure 8:
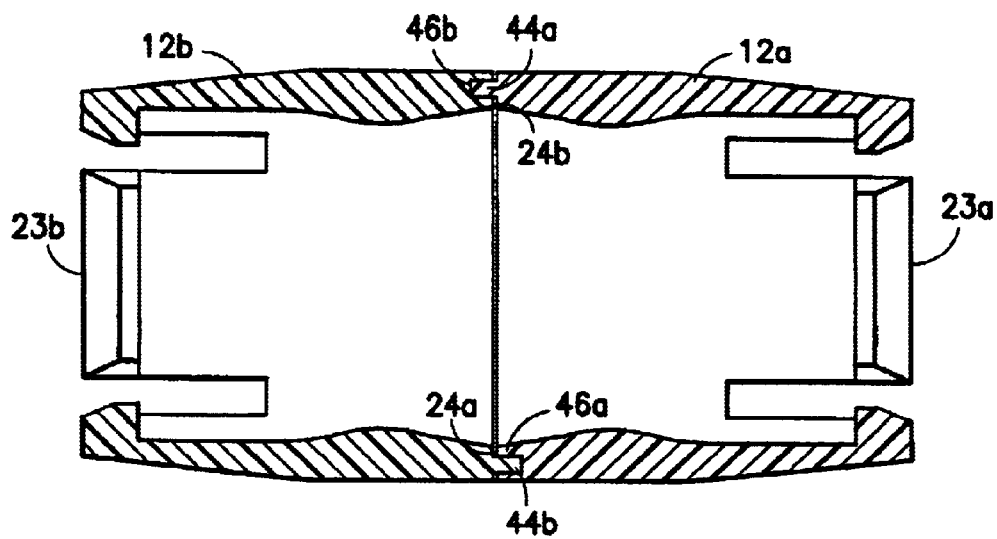
FIG. 8 is a longitudinal section of the pair of clamp shown in FIG. 7.

Referring to FIGS. 4 and 6, according to a preferred, but optional, aspect of the invention, the second end 24 of the clamp 12 is provided with a plurality of alternating pegs 44 and holes 46 (see also FIG. 2) oriented parallel to the axis of the clamp. Referring to FIGS. 7 and 8, alternating pegs 44a and holes 46a on the second end 24a of a first clamp 12a correspond to alternating holes 46b and pegs 44b on the second end 24b of a second clamp 12b such that the second ends 24a, 24b of two clamps can be detachably coupled by an interference fit between the respective pegs and holes. The advantage of this arrangement is described below.

Referring now to FIGS. 7 through 9, a pair of clamps 12a, 12b may be placed on a tubing 22. The second end 24a of the first clamp 12a is inserted over one end of the tubing, and the second end 24 of the second clamp 12b is inserted over the other end of the tubing, and the second clamp 12b is slid along the tubing until it meets and is coupled to the first clamp 12a in the above described back-to-back arrangement. Alternatively, the clamps 12a, 12b are first coupled together in the back-to-back arrangement, and then the tubing 22 is guided through the first end 23b of the second clamp 12b and out the first end 23a of the first clamp 12a.

A first end 48 of the tubing is then positioned over a port element 16a of a component such as a manifold 50. A lubricant may be applied to the port element, and particularly to the barb, to facilitate positioning the first end 48 of the tubing 22 over the port element 16a. As the tubing 22 is forced over the barb, the tubing 22 expands to accommodate the barb. Referring to FIGS. 2 and 9, the first clamp 12a is then forced along the tubing 22 until the ramped portions 39 of the fingers 30 of the clamp 12a contact the beveled lip 25 of the port element 16a. The ramped portions 39 then ride over the bevel of the lip 25, with each functioning as cooperating ramps to expand the fingers 30 slightly and guide the catches 36 over the lip 25 and into the groove 27. When the catches 36 enter the groove 27 the two components are locked together, thereby forming a partial assembly 52.

Once the partial assembly 52 is assembled off-site, the connection at the second end 54 of the tubing 22 may be completed at a job site. Referring to FIGS. 9 and 10, once at the job site, the second clamp 12b is decoupled from the first clamp 12a and slid along the tubing 22 to a location adjacent the second end 54 of the tubing 22. The second end 54 of the tubing 22 is then provided on the second port element 16b of a component such as a spa jet valve body 56, and secured as described above.

The ability to partially assemble the tubing to a port element with the coupling system, and to have all required components for completion of the assembly located on the tubing, facilitates a relatively easy and expedited assembly at the job site. Fewer connections must be made at the job site. The connections that must be made are easy to secure. Moreover, no tools or other components must be brought to the job site. Nevertheless, the resulting couplings are secure and water-tight.

Where the optional back-to-back arrangement of the clamps is not utilized, each clamp is used to couple an end of tubing to a port element in substantially the same manner as described above, without the step of decoupling the clamps from one another. In addition, each clamp is preferably always provided on the tubing by inserting the tubing through the second end of the clamp. Furthermore, the clamp required for completing the assembly at the job site must be separately brought to the job site.

While the coupling system has been described with respect to ports on a manifold and a spa jet valve body, it will be appreciated that ports structured as described can be provided on any plumbing fixture requiring or beneficially using a quick, easy, and inexpensive coupling to a flexible tubing.

Figure 11:
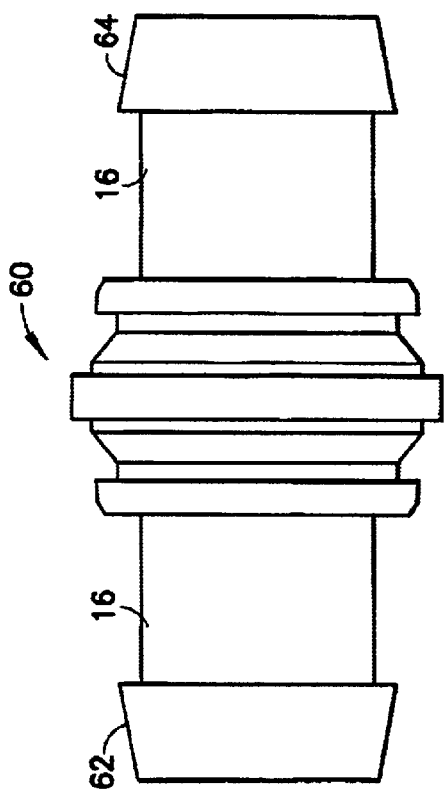
FIG. 11 is a side elevation view of a tube-to-tube connector port element according to an embodiment of a coupling system of the invention.
Figure 12:
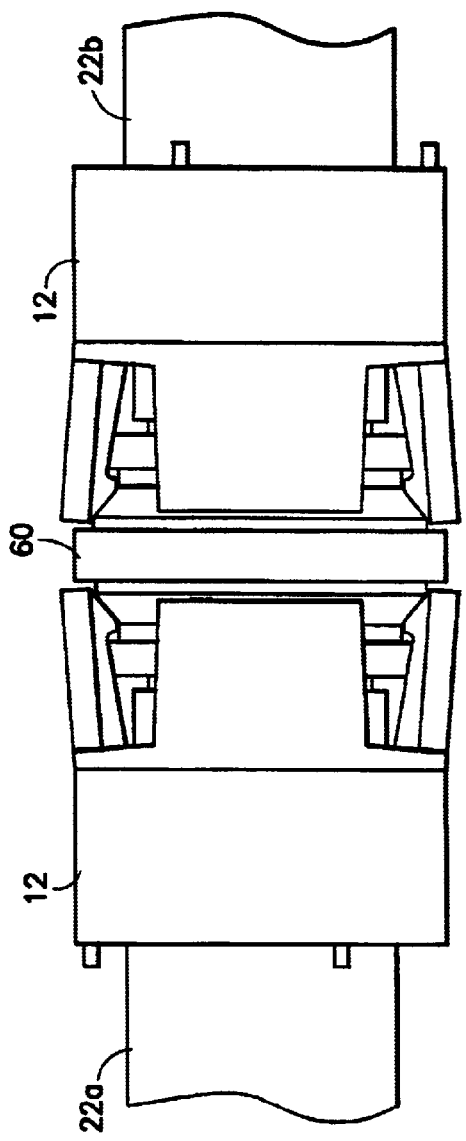
FIG. 12 is a broken side view illustrating use of the tube-to-tube connector port element of FIG. 11.

In addition, referring to FIG. 11, in accord with the invention, a tube-to-tube connector 60 plumbing fixture is provided. The tube-to tube connector 60 is a tubular member having first and second ends 62, 64 each provided with a port element 16 as described above. Referring now to FIG. 12, as such, the tube-to-tube connector 60, in combination with two clamps 12, is adapted to couple two pieces of flexible tubing 22a, 22b together. Each piece of tubing 22a, 22b is coupled to one end of the connector 60, as described above, to provide a secure, water-tight coupling.

There have been described and illustrated herein a coupling system for coupling flexible tubing to a port element and a method of using the same. While particular embodiments of the invention have been described, it is not intended that the invention be limited thereto, as it is intended that the invention be as broad in scope as the art will allow and that the specification be read likewise. Thus, while the use of the invention for coupling manifolds and spa jet ports on spas and hot tubs have been disclosed, it will be appreciated that the invention can be used to couple tubing to ports on other objects as well so long as the ports have the required barb at an end. Also, while a clamp having a particular number and size of barbed fingers was disclosed, it will be appreciated that the clamp could be formed with more or fewer fingers. In addition, while particular materials have been disclosed for the construction of the clamp, it will be understood that the clamp can be formed in whole or in part from other materials as well; for example, schedule #40 PVC, polyethylene or polypropylene. Also, while it is preferable that the clamp have a substantially cylindrical exterior shape, it will be recognized that the exterior of the clamp can be formed into any number of shapes, including but not limited to octagonal, such that the clamp may be securely gripped by a technician. In addition, while male and female interference fit couplings have been disclosed to couple two clamps together, it will be appreciated that other types of couplings can alternately be used. For example, snap fits and detachable latches can also be used. Moreover, the two clamps do not need to have the same structure facilitating the detachable coupling. In addition, while a particular configuration has been disclosed in reference to the number and location of the pegs and holes for the interference fit coupling, it will be appreciated that fewer or more pegs and holes can be used as well. Further, while a port element having one circumferential barb is preferred, it will be appreciated that there may be multiple barbs on the port element and that each need not extend completely about the port element. In addition, while a catch defined by a lip and a groove is described, it will be appreciated that other catches may be used. Moreover, while the coupling system of the invention facilitates partial assembly off-site, it will be appreciated that the system may be used to expedite plumbing connections in which all connections are made on-site. In addition, while the steps of assembly were described in a particular order, it will be appreciated that the steps may be performed in another order and that the invention is intended to cover such other orders unless explicitly stated otherwise. It will therefore be appreciated by those skilled in the art that yet other modifications could be made to the provided invention without deviating from its spirit and scope as claimed.

What is claimed is:

1. An apparatus for clamping a flexible tubing which is coupled to a port of a plumbing fixture, the port having a barb with a larger diameter than an inner diameter of the flexible tubing, said apparatus comprising:

a clamping member having a first end, a second end, a clamping portion between said first and second ends, and an axial channel therethrough, said first end of said clamping member being formed as a plurality of axially extending fingers, each tapering inward toward a center of said channel and having an radially inwardly directed catch which includes a blunt inner portion, said fingers defining a first interior diameter measured at said catch, said second end having a second interior diameter, and said clamping portion having a third interior diameter larger than said first interior diameter and smaller than said second interior diameter.

2. An apparatus according to claim 1, wherein:
said clamping member is molded as a single piece.

3. An apparatus according to claim 1, wherein:
each said finger includes a ramped portion at an end of said finger.

4. An apparatus according to claim 1, wherein:
said second end of said clamping member is provided with detachable coupling means for detachably coupling said second end of said clamping member to another clamping member.

5. An apparatus according to claim 4, wherein:
said detachable coupling means includes a plurality of projections and a plurality of holes sized for an interference fit with said plurality of projections.

6. An apparatus according to claim 1, wherein:
said third diameter is larger than the exterior diameter of the tubing.

7. An apparatus according to claim 1, further comprising:
a second clamping member having a first end, a second end, and an axial channel therethrough, said first end of said second clamping member being formed as a plurality of axially extending fingers,
wherein said second ends of each of said clamping members include detachable coupling means for detachably coupling said second ends of said clamping members to each other.

8. A coupling assembly for coupling flexible tubing having an inner diameter and an outer diameter to a plumbing fixture, said coupling assembly comprising:
a) a unitary plumbing fixture defining a tubular port provided with a circumferential barb at a port end thereof and a catch, said barb tapering in outer diameter from a maximum outer diameter to said port end; and
b) a clamping member having a first end, a second end, and an axial channel therethrough, said first end of said clamping member being formed as a plurality of axially extending fingers each having a radially inwardly directed barb and a ramped portion at an end of said finger, said fingers defining a first inner diameter measured at said barbs, said second end having a second inner diameter, and a portion between said first and second end having a third inner diameter larger than said first inner diameter and said maximum outer diameter of said circumferential barb,
wherein when said tubular port of said plumbing fixture is inserted into the tubing and said clamping member is provided over the tubing and said tubular port, said barbs of said clamping member engage in said catch and secure said clamping member and the tubing to said port.

9. A coupling assembly according to claim 8, wherein:
said clamping member is molded as a single piece.

10. A coupling assembly according to claim 8, wherein:
each said finger includes a blunt inner portion.

11. A coupling assembly according to claim 8, wherein:
said catch is at least partially defined by a groove.

12. A coupling assembly according to claim 11, wherein:
said groove is at least partially defined by a lip.

13. A coupling assembly according to claim 12, wherein:
said lip is tapered toward said barb.

14. A coupling assembly according to claim 8, wherein:
said second end of said clamping member is provided with detachable coupling means for detachably coupling said second end of said clamping member to another clamping member.

15. A coupling assembly according to claim 14, wherein:
said detachable coupling means includes a plurality of projections and a plurality of holes sized for an interference fit with said plurality of projections.

16. A coupling assembly according to claim 8, further comprising:
c) a second clamping member, wherein said clamping members each include detachable coupling means for detachably coupling said clamping members to each other.

17. A tubing coupling assembly, comprising:
a) flexible tubing having an end with an inner diameter and an outer diameter;
b) a plumbing fixture having a tubular port provided with a circumferential barb at a port end thereof and a catch, said circumferential barb tapering in outer diameter from a maximum outer diameter to said port end; and
c) a first clamping member having a first end, a second end, a clamping portion between said first and second end, and an axial channel therethrough, said first end of said clamping member being formed as a plurality of axially extending fingers each having an radially inwardly directed barb,
wherein said end of said flexible tubing is provided over said circumferential barb of said port, and said first clamping member is provided over said tubing and said port such that said barbs on said fingers engage said catch of said port and said clamp clamps said tubing between said clamping portion and said circumferential barb of said port of said plumbing fixture; and
d) a second clamping member substantially the same as said first clamping member each of said first and second clamping members includes detachable coupling means for detachably coupling said second ends of said first and second clamping members to each other.

18. A tubing assembly according to claim 17, wherein:
said second end has a second diameter, and said clamping portion has a third diameter smaller than said second diameter.

19. An apparatus for clamping a flexible tubing which is coupled to a port of a plumbing fixture, the port having a barb with a larger diameter than an inner diameter of the flexible tubing, said apparatus comprising:
a clamping member having a first end, a second end, a clamping portion between said first and second ends, and an axial channel therethrough, said first end of said clamping member being formed as a plurality of axially extending fingers, each tapering inward toward a center of said channel, having an radially inwardly directed catch and including a ramped portion at an end of said finger, said fingers defining a first interior diameter measured at said catch, said second end having a second interior diameter, and said clamping portion having a third interior diameter larger than said first interior diameter and smaller than said second interior diameter.

20. An apparatus for clamping a flexible tubing which is coupled to a port of a plumbing fixture, the port having a barb with a larger diameter than an inner diameter of the flexible tubing, said apparatus comprising:
a clamping member having a first end, a second end, a clamping portion between said first and second ends, and an axial channel therethrough,
said first end of said clamping member being formed as a plurality of axially extending fingers, each tapering inward toward a center of said channel, and having an radially inwardly directed catch, said fingers defining a first interior diameter measured at said catch,
said second end having a second interior diameter and being provided with detachable coupling means for detachably coupling said second end of said clamping member to another clamping member, and
said clamping portion having a third interior diameter larger than said first interior diameter and smaller than said second interior diameter.

21. An apparatus according to claim 20, wherein:
said detachable coupling means includes a plurality of projections and a plurality of holes sized for an interference fit with said plurality of projections.

22. An apparatus for clamping a flexible tubing which is coupled to a port of a plumbing fixture, the port having a barb with a larger diameter than an inner diameter of the flexible tubing, said apparatus comprising:
   a) a first clamping member having a first end, a second end, a clamping portion between said first and second ends, and an axial channel therethrough, said first end of said clamping member being formed as a plurality of axially extending fingers, each tapering inward toward a center of said channel and having an radially inwardly directed catch, said fingers defining a first interior diameter measured at said catch, said second end having a second interior diameter, and said clamping portion having a third interior diameter larger than said first interior diameter, and smaller than said second interior diameter; and
   b) a second clamping member having a first end, a second end, and an axial channel therethrough, said first end of said second clamping member being formed as a plurality of axially extending fingers,
      wherein said second ends of each of said first and second clamping members include detachable coupling means, for detachably coupling said second ends of said first and second clamping members to each other.

23. A coupling assembly for coupling flexible tubing having an inner diameter and an outer diameter to a plumbing fixture, said coupling assembly comprising:
   a) a unitary plumbing fixture defining a tubular port provided with a circumferential barb at a port end thereof and a catch, said barb tapering in outer diameter from a maximum outer diameter to said port end; and
   b) a clamping member having a first end, a second end, and an axial channel therethrough, said first end of said clamping member being formed as a plurality of axially extending fingers each having a radially inwardly directed barb and a blunt inner portion, said fingers defining a first inner diameter measured at said barbs, said second end having a second inner diameter, and a portion between said first and second end having a third inner diameter larger than said first inner diameter and said maximum outer diameter of said circumferential barb,
      wherein when said tubular port of said plumbing fixture is inserted into the tubing and said clamping member is provided over the tubing and said tubular port, said barbs of said clamping member engage in said catch and secure said clamping member and the tubing to said port.

24. A coupling assembly for coupling flexible tubing having an inner diameter and an outer diameter to a plumbing fixture, said coupling assembly comprising:
   a) a unitary plumbing fixture defining a tubular port provided with a circumferential barb at a port end thereof and a catch, said barb tapering in outer diameter from a maximum outer diameter to said port end, and said catch being at least partially defined by a groove, said groove being at least partially defined by a lip, and said lip being tapered towards said barb; and
   b) a clamping member having a first end, a second end, and an axial channel therethrough, said first end of said clamping member being formed as a plurality of axially extending fingers each having a radially inwardly directed barb, said fingers defining a first inner diameter measured at said barbs, said second end having a second inner diameter, and a portion between said first and second end having a third inner diameter larger than said first inner diameter and said maximum outer diameter of said circumferential barb,
      wherein when said tubular port of said plumbing fixture is inserted into the tubing and said clamping member is provided over the tubing and said tubular port, said barbs of said clamping member engage in said catch and secure said clamping member and the tubing to said port.

25. A coupling assembly for coupling flexible tubing having an inner diameter and an outer diameter to a plumbing fixture, said coupling assembly comprising:
   a) a unitary plumbing fixture defining a tubular port provided with a circumferential barb at a port end thereof and a catch, said barb tapering in outer diameter from a maximum outer diameter to said port end; and
   b) a clamping member having a first end, a second end, and an axial channel therethrough,
      said first end of said clamping member being formed as a plurality of axially extending fingers each having a radially inwardly directed barb, said fingers defining a first inner diameter measured at said barbs,
      said second end having a second inner diameter and including a detachable coupling means for detachably coupling said second end of said clamping member to another clamping member, and
      a portion between said first and second end having a third inner diameter larger than said first inner diameter and said maximum outer diameter of said circumferential barb,
      wherein when said tubular port of said plumbing fixture is inserted into the tubing and said clamping member is provided over the tubing and said tubular port, said barbs of said clamping member engage in said catch and secure said clamping member and the tubing to said port.

26. A coupling assembly for coupling flexible tubing having an inner diameter and an outer diameter to a plumbing fixture, said coupling assembly comprising:
   a) a unitary plumbing fixture defining a tubular port provided with a circumferential barb at a port end thereof and a catch, said barb tapering in outer diameter from a maximum outer diameter to said port end;
   b) a first clamping member having a first end, a second end, and an axial channel therethrough, said first end of said clamping member being formed as a plurality of axially extending fingers each having a radially inwardly directed barb, said fingers defining a first inner diameter measured at said barbs, said second end having a second inner diameter, and a portion between said first and second end having a third inner diameter larger than said first inner diameter and said maximum outer diameter of said circumferential barb,
      wherein when said tubular port of said plumbing fixture is inserted into the tubing and said clamping member is provided over the tubing and said tubular port, said barbs of said clamping member engage in said catch and secure said clamping member and the tubing to said port; and
   c) a second clamping member, wherein said clamping members each include detachable coupling means for detachably coupling said clamping members to each other.

* * * * *